US010432572B2

(12) United States Patent
Siswadi et al.

(10) Patent No.: US 10,432,572 B2
(45) Date of Patent: Oct. 1, 2019

(54) CONTENT POSTING METHOD AND APPARATUS

(71) Applicant: Path Mobile Inc Pte. Ltd., Singapore (SG)

(72) Inventors: Jessica Siswadi, Jakarta (ID); Kyoung Chan Lee, Seoul (KR)

(73) Assignee: Path Mobile Inc Pte. Ltd., Singapore (SG)

( * ) Notice: Subject to any disclaimer, the term of this patent is extended or adjusted under 35 U.S.C. 154(b) by 387 days.

(21) Appl. No.: 15/299,265

(22) Filed: Oct. 20, 2016

(65) Prior Publication Data
US 2018/0006992 A1 Jan. 4, 2018

(30) Foreign Application Priority Data

Jul. 1, 2016 (KR) .................... 10-2016-0083735

(51) Int. Cl.
*G06F 15/16* (2006.01)
*H04L 12/58* (2006.01)
*G06Q 50/00* (2012.01)

(52) U.S. Cl.
CPC .............. *H04L 51/32* (2013.01); *H04L 51/12* (2013.01); *G06Q 50/01* (2013.01)

(58) Field of Classification Search
CPC ... H04L 51/32; H04L 47/125; H04L 63/0227; H04L 65/80; H04L 63/0853
USPC ................................................ 709/204–206
See application file for complete search history.

(56) References Cited

U.S. PATENT DOCUMENTS

| 2015/0150147 A1* | 5/2015 | Keohane | G06F 21/6209 |
| | | | 726/28 |
| 2015/0156236 A1* | 6/2015 | McCall | H04L 65/60 |
| | | | 709/204 |
| 2015/0248777 A1* | 9/2015 | Konishi | G06F 17/289 |
| | | | 345/441 |
| 2015/0334219 A1* | 11/2015 | Soundararajan | H04M 1/67 |
| | | | 455/414.1 |

FOREIGN PATENT DOCUMENTS

| KR | 10-2014-0095567 A | 8/2014 | |
| KR | 10-2014-0130312 A | 11/2014 | |
| WO | 2015/119605 A | 8/2015 | |
| WO | WO215119605 | * 8/2015 | ............... G06F 3/14 |

OTHER PUBLICATIONS

Screenshot of Path Android Version 5.3.0 released on Jun. 16, 2016, downloadable from http://apkfeed.com/apk/path/path-5-3-0/path-5-3-0-apk-download/584/com-path/.

(Continued)

*Primary Examiner* — David R Lazaro
*Assistant Examiner* — Mariegeorges A Henry
(74) *Attorney, Agent, or Firm* — Knobbe Martens Olson & Bear LLP

(57) ABSTRACT

Disclosed is a method and apparatus for posting content, the method including posting, when a predetermined hash tag is detected from first type content for which a posting request is sent, second type content generated based on text information acquired from the first type content and image information acquired from a database, and posting the first type content when the hash tag is not detected.

10 Claims, 7 Drawing Sheets

(56) References Cited

OTHER PUBLICATIONS

Screenshot of Twitter posting on Jun. 17, 2016 via iPhone.
News article on Jun. 18, 2016 downloadable from http://tekno.kompas.com/read/2016/06/18/13180067/Cara.Bikin.Posting-an.PathDaily.di.Path.
News article on Jun. 18, 2016 downloadable from http://tekno.liputan6.com/read/2534422/menjajal-update-kekinian-path-daily.
Screenshot of Google Play on Jun. 19, 2016, downloadable from https://play.google.com/store/apps/details?id=com.path.
Screenshot of Apple App Store on Jun. 20, 2016 via iPhone.
Screenshot of Path Application on Jun. 20, 2016, via iPhone.
Office Action dated Jul. 18, 2017 of corresponding Korean Patent Application No. 10-2016-0083735—7 pages.
"PHOLAR! Introduce a new SNS, Pholar, enabling tag following! + Today's Hot Issue", Naver Blog, Apr. 14, 2015, downloadable from http://blog.naver.com/disupatch/220330769420—19 pages.

* cited by examiner

CONTENT POSTING METHOD AND APPARATUS

CROSS-REFERENCE TO RELATED APPLICATION(S)

This application claims the priority benefit of Korean Patent Application No. 10-2016-0083735 filed on Jul. 1, 2016, in the Korean Intellectual Property Office, the disclosure of which is incorporated herein by reference for all purposes.

BACKGROUND

1. Field

One or more embodiments relate to a method and apparatus for posting content.

2. Description of Related Art

With developments of Internet technology, a social networking service (SNS), for example, YouTube®, Twitter®, and Facebook® has been actively used by individuals to have a relationship with others in a virtual space on the Internet, communicate with friends, and shares various information.

Through the SNS, users may share information or communicate with mutually connected friends, which may enhance a relationship thereof. Also, the users may create a community of common interesting subject and continuously form a new relationship. An action of creating various contents or an article created by a user on a blog and a community may be referred to as "posting".

SUMMARY

According to an aspect, there is provided a method of posting content, the method including receiving a posting request for first type content; detecting a predetermined hash tag from the first type content; if the hash tag is detected, acquiring text information obtained by removing the hash tag from the first type content, acquiring image information used to convert the first type content into second type content, generating the second type content based on the image information and the text information, and posting the second type content; and if the hash tag is not detected, posting the first type content.

The first type content may include text content, and the second type content may include image content.

The text information may include at least one of a text and an in-line object, and the image information may include at least one of a still image and a moving image.

The generating of the second type content may include at least one of performing first image processing such that the text information is displayed over the image information, performing second image processing such that the text information is displayed in an area differing from an area in which the image information is displayed, and performing third image processing by displaying the image information over the text information and adjusting a transparency of the image information such that the text information is displayed.

A text included in the text information may be image-processed based on first color information, first size information, first font information, and first location information, and an in-line object included in the text information may be image-processed based on second color information, second size information, and second location information.

The generating of the second type content may further include at least one of performing fourth image processing such that the hash tag is displayed over the image information, performing fifth image processing such that the hash tag is displayed in an area differing from the area in which the image information is displayed, and performing sixth image processing by displaying the image information over the hash tag and adjusting the transparency of the image information such that the hash tag is displayed.

The hash tag may be image-processed based on third color information, third size information, third font information, and third location information, or may be displayed using a hash tag image corresponding to the hash tag.

The acquiring of the image information may include randomly selecting an image or images as the image information from candidate images stored in a database.

The acquiring of the image information may include selecting an image or images as the image information from candidate images stored in a database, based on at least one of the text information, information associated with a user of a user terminal, information associated with an advertiser, information associated with a time at which the first type content is generated, and information associated with a location in which the first type content is generated.

The posting of the second type content may include posting the second type content on a first area in which image information is displayed, and displaying the hash tag in a second area in which text information is displayed.

The method may further include determining, if the hash tag is detected, whether at least a portion of the text information is lost due to a conversion of the first type content into the second type content, and posting the first type content in response to a determination that at least a portion of the text information is lost due to the conversion.

According to another aspect, there is also provided a social networking server including a communication interface configured to receive a posting request for first type content from a user terminal; a detector configured to detect a predetermined hash tag from the first type content; and a poster configured to: if the hash tag is detected, acquire text information obtained by removing the hash tag from the first type content, acquire image information used to convert the first type content into second type content, generate the second type content based on the image information and the text information, and post the second type content; and if the hash tag is not detected, post the first type content.

According to still another aspect, there is also provided a user terminal including a user interface configured to receive first type content from a user; a processor configured to: detect a predetermined hash tag from the first type content, and if the hash tag is detected, acquire text information obtained by removing the hash tag from the first type content, acquire image information used to convert the first type content into second type content, and generate the second type content based on the image information and the text information; and a communication interface configured to: if the hash tag is detected, request a social networking server to post the second type content, and if the hash tag is not detected, request the social networking server to post the first type content.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
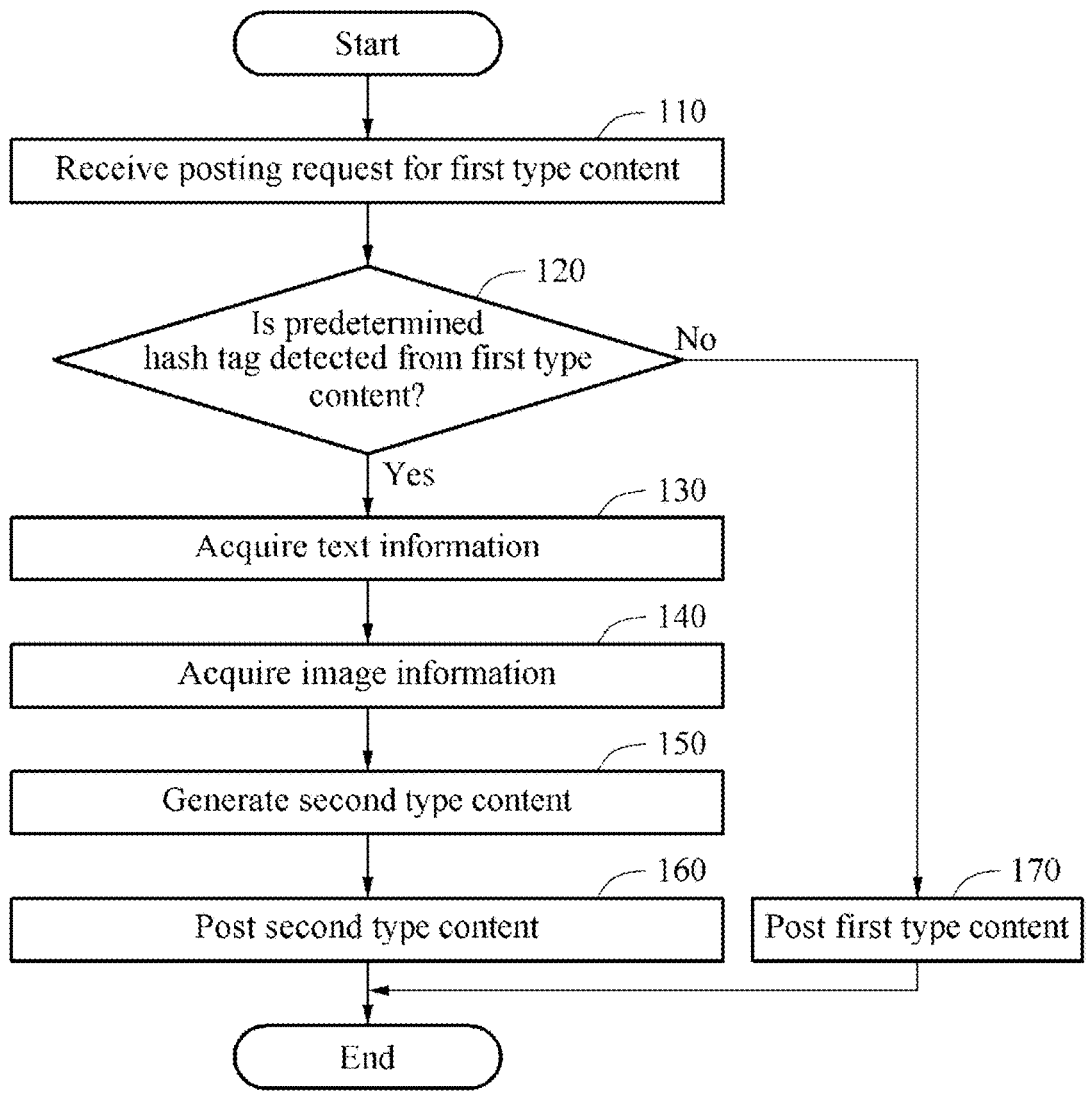
FIG. 1 is a flowchart illustrating a content posting method according to an embodiment.

Hereinafter, some embodiments will be described in detail with reference to the accompanying drawings. Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a flowchart illustrating a content posting method according to an embodiment. Referring to FIG. 1, in operation 110, a posting apparatus may receive a posting request for first type content. The posting apparatus may be an apparatus configured to post content on a social network service, and may be implemented through one or more software modules, one or more hardware modules, or various combinations thereof. The posting apparatus may be a server for providing a social network service. The posting apparatus may also be a user terminal configured to operate in conjunction with a server for providing a social network service. In this example, an application for the social network service may be installed in the user terminal. The posting apparatus may also be implemented through a combination of a server and a user terminal.

A posting request for first type content may be transmitted to the posting apparatus when a user selects a menu icon displayed on a user terminal and creates content. Here, the menu icon will be further described with reference to a menu icon 420 of FIG. 4A. The first type content may include text content.

In operation 120, the posting apparatus may detect a predetermined hash tag from the first type content. The hash tag may be, for example, metadata used to easily classify and retrieve articles. The hash tag may include a hash sign, #, or a predetermined word or phrase. The hash tag may be, for example, "#pathdaily".

When the hash tag is not detected in operation 120, the posting apparatus may post the first type content in operation 170. In this example, the posting apparatus may post the first type content without content conversion.

When the hash tag is detected in operation 120, the posting apparatus may remove the hash tag from the first type content and acquire text information in operation 130. The text information may include at least one of a text and an in-line object. It is understood that the text information include, for example, a text input using an actual keyboard or a virtual keyboard provided through a touch interface and an in-line object an animation, an image, an emoticon, and a sigh to be input in an in-line form.

The posting apparatus may acquire the text information by removing the hash tag from the first type content irrespective of a location of the hash tag in the first type content. The posting apparatus may acquire the text information by removing the hash tag from the first type content irrespective of where the hash tag is located, for example, at a beginning, at an end, or in a middle of a sentence or a phrase included in the first type content.

The posting apparatus may acquire the text information by removing the hash tag from the first type content irrespective of a number of times that the hash tag appears in the first type content. The posting apparatus may acquire the text information by removing the hash tag from the first type content even though the hash tag appears in the first type content twice or more.

In operation 140, the posting apparatus may acquire image information to convert the first type content into second type content. The image information may include at least one of a still image and a moving image. The image information may be, for example, stored in an image database of a server, or stored in an image database or a memory of a user terminal.

The posting apparatus may randomly select an image or images from candidate images stored in a database. The posting apparatus may also select one of the candidate information stored in the database based on a predetermined criterion. The predetermined criterion may include at least one of text information, information associated with the user of the user terminal, information associated with an advertiser, information associated with a time at which the first type content is generated, and information associated with a location in which the first type content is generated.

Here, the text information may be the text information acquired in operation 130. The information associated with the user may be information associated with a gender, an age, a religion, an occupation, and a hobby of the user, or information determined through an analysis on an activity, for example, "connect to page", "comment, share", and "likes" of the user in a social network service. The information associated with the gender, the age, the occupation, and the hobby of the user may be user profile information. The information associated with the advertiser may be information associated with an advertising agency based on the social network service. The information associated with the time at which the first type content is generated may be information indicating a time at which the user creates the first type contents or makes a posting request for the first type content. The information associated with the location in which the first type content is generated may be information indicating a location, for example, a country, a mountain, an ocean, a bally, a desert, and other places in which the user creates the first type content or makes the posting request for the first type content.

In an example, the posting apparatus may acquire a place or the location in which the user creates the first type content using a global positioning system (GPS) module, and acquire information on topography, for example, the North Pole, the South Pole, an ocean, a mountain, and a desert, used to identify the location or acquired coordinates. The GPS module will be further described with reference to a GPS module 660 of FIG. 6. The user may create the first type content in the desert and information associated with the desert, for example, an image of the desert may be stored in the database. In this example, the posting apparatus may acquire the location in which the first type content is generated, for example, the desert, and acquire an image corresponding to the desert or an image associated with the desert among the candidate image information stored in the database as the image information.

In operation 150, the posting apparatus may generate the second type content based on the image information and the text information. The second type content may be, for example, image content. The second type content may also be referred to as, for example, a viral image. The posting apparatus may perform image processing such that the text information is displayed on the image information. Also, the posting apparatus may perform the image processing such that the hash tag is displayed on the image information. A method of performing the image processing using the posting apparatus will be described with reference to FIGS. 5A and 5B.

In operation 160, the posting apparatus may post the second type content. As further described with reference to FIG. 5B, the posted second type content may be displayed in a first area, for example, a first area 530 of FIG. 5B including the image information. According to an embodiment, the hash tag may be displayed in a second area, for example, a second area 540 of FIG. 5B including the text information in connection with the first area.

When the hash tag is detected in operation 120, the posting apparatus may determine whether at least a portion of the text information is lost due to the conversion from the first type content to the second type content. For example, the posting apparatus may count a number of words included in the text information. In this example, it is understood that the number of words includes the number of in-line objects and the number of characters corresponding to the text. When the number of words is greater than a predetermined number, the posting apparatus may determine that at least a portion of the text information is lost. In response to the determining that at least a portion of the text information is lost, the posting apparatus may post the first type content.

For example, the predetermined number may be 50 and the number of words counted from the first type content may be 57. Since the counted number of words is greater than the predetermined number, the posting apparatus may determine that at least a portion of the text information is lost during the conversion from the first type content to the second type content. The posting apparatus may post the first type content without conversion.

When content, for example, a text, an image, and a sound generated in association with an activity of an user is posted, the posted content item may also be referred to as moments that indicates a momentary record of the user. Users connected through the social networking system may interact with the posted content item, the moments.

As described above, the content posting method of FIG. 1 may be performed in the server or the user terminal. Hereinafter, a content posting method performed by the server will be described as an example with reference to FIG. 2. Also, a content posting method performed by the user terminal will be described as an example with reference to FIG. 3. In the following examples, various changes are applicable to the content posting method to be, for example, partially performed by a server and partially performed by a user terminal.

Figure 2:
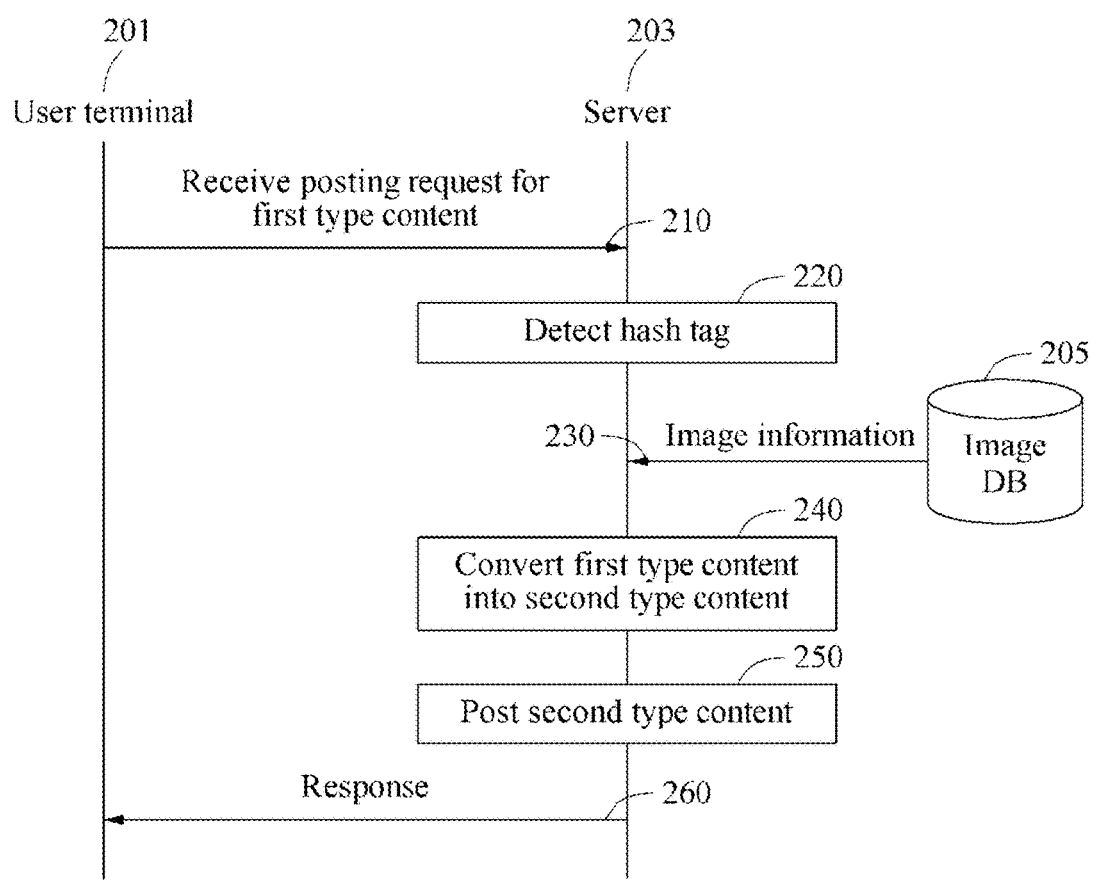
FIG. 2 is a diagram illustrating a procedure of a content posting method performed in a server according to an embodiment.

FIG. 2 is a diagram illustrating a procedure of performing a content posting method in a server according to an embodiment. The content posting method may be performed through a communication between a user terminal 201 and a server 203. The user terminal 201 may be, for example, a terminal including an application for posting content.

Referring to FIG. 2, the server 203 may receive a posting request for first type content from the user terminal 201 in operation 210 and may detect a predetermined hash tag, for example, "#pathdaily" from the first type content in operation 220. In this example, the server 203 may remove the hash tag from the first type content and acquire text information. The server 203 may acquire image information from an image database 205 in operation 230. The server 203 may convert the first type content into second type content in operation 240. The server 203 may generate the second type content based on the image information and the text information and convert the first type content into the second type content. For example, the server 203 may convert text content into image content by combining text information input by a user and an image provided in the server 203. The server 203 may store the second type content in a database, and then post the second type content in operation 250. The server 203 may respond to the posting request received in operation 210 by transmitting the posted second type content to the user terminal 201 in operation 260.

Figure 3:
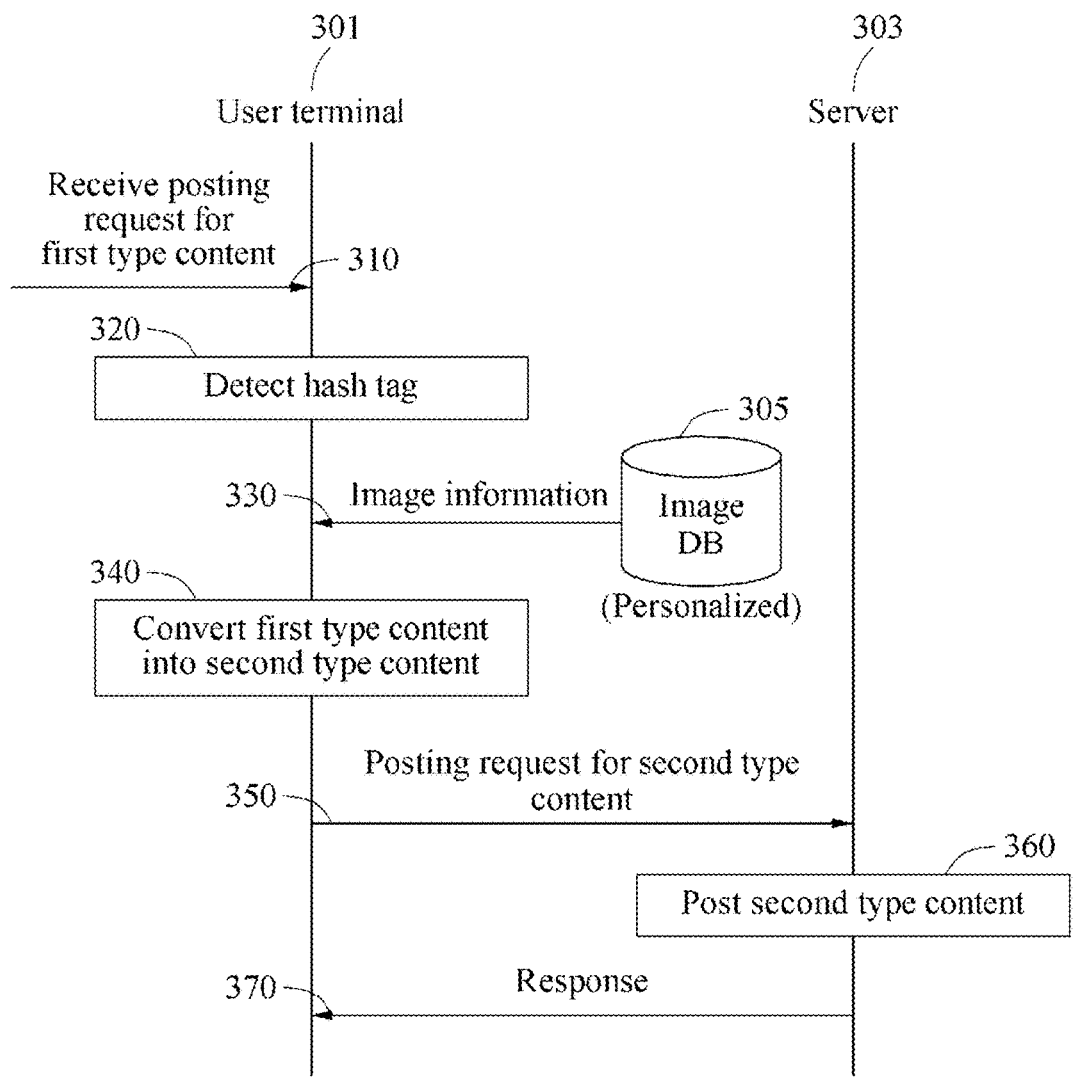
FIG. 3 is a diagram illustrating a procedure of a content posting method performed in a user terminal according to an embodiment.

FIG. 3 is a diagram illustrating a procedure of a content posting method performed in a user terminal according to an embodiment. The content posting method may be performed through a communication between a user terminal 301 and a server 303. The user terminal 301 may be, for example, a terminal including an application for posting content.

Figure 4A:
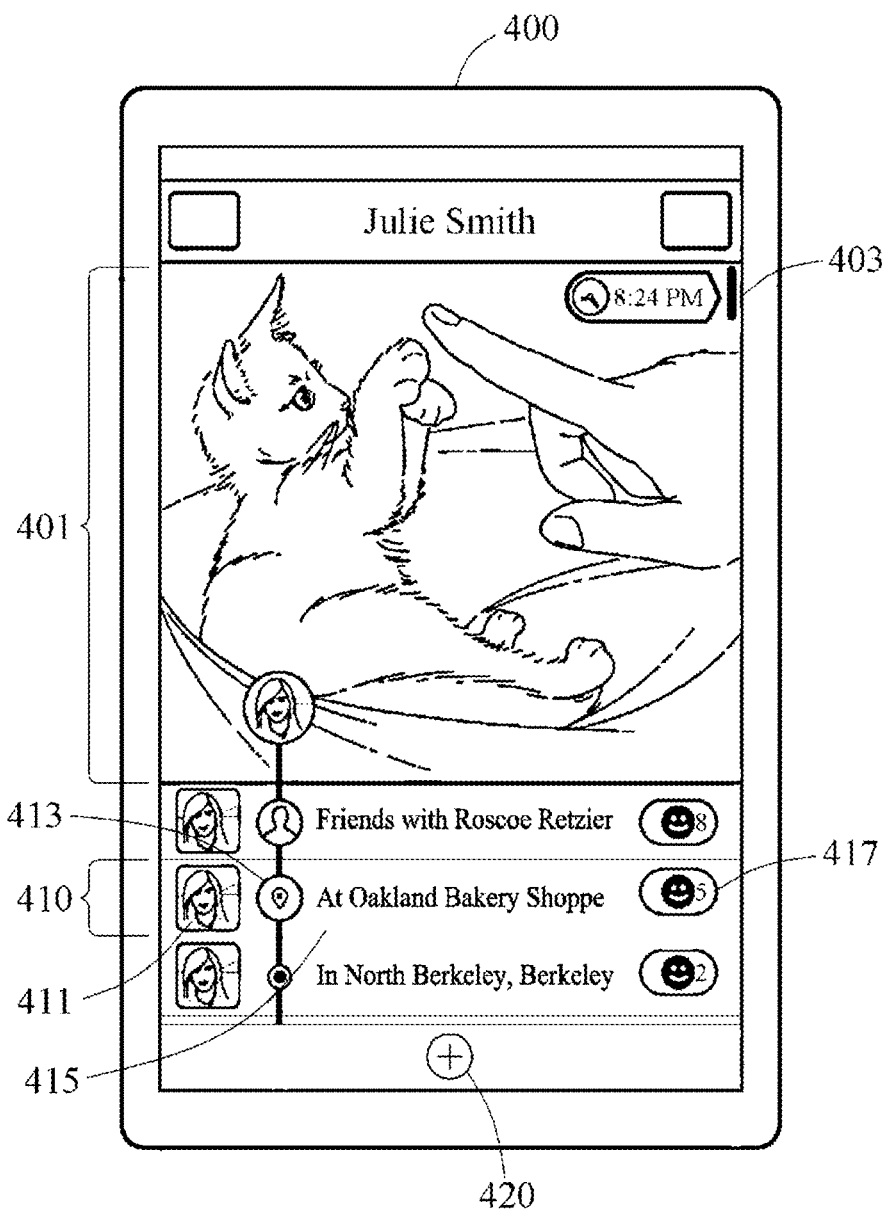
FIGS. 4A and 4B are diagrams illustrating a user interface provided for content posting according to an embodiment.

Referring to FIG. 3, in operation 310, the user terminal 301 may receive a posting request for first type content from a user through an application for posting content. The application for content posting may provide an intuitive graphical user interface (GUI). An example of the GUI of the user terminal 301 is illustrated in FIG. 4A. The user may create content by selecting a menu icon, for example, the menu icon 420 of FIG. 4A, on a display to make the posting request. A procedure of creating the first type content performed by the user will be described with reference to FIGS. 4A, 4B, 5A, and 5B.

In operation 320, the user terminal 301 may detect a predetermined hash tag, for example, "#pathdaily" from the first type content. In this example, the user terminal 301 may remove the hash tag from the first type content and acquire text information.

In operation 330, the user terminal 301 may acquire image information from an image database 305. For example, the image database 305 may be a personalized database stored in the user terminal 301. Also, the image database 305 may be a database stored in the server 303 or an external source of the user terminal 301, or the same as the image database 205 of FIG. 2.

In operation 340, the user terminal 301 may convert the first type content into second type content. The user terminal 301 may generate the second type content based on the image information and the text information and convert the first type content into the second type content. In an example, the second type content may also include the hash tag detected and removed from the first type content.

In operation 350, the user terminal 301 may transmit the second type content to the server 303 to request the server 303 to post the second type content. In response to the posting request, the server 303 may store the second type content in, for example, a database. The server 303 may post the second type content in operation 360. In operation 370, the server 303 may respond to the posting request of operation 350 by transmitting a posting result to the user terminal 301.

For example, the user terminal 301 may transmit the test information acquired in operation 320 to the server 303 such that operations 330 and 340 are performed by the server 303. In this example, the server 303 may post the second type content irrespective of whether the posting request of operation 350 is received.

Figure 4B:
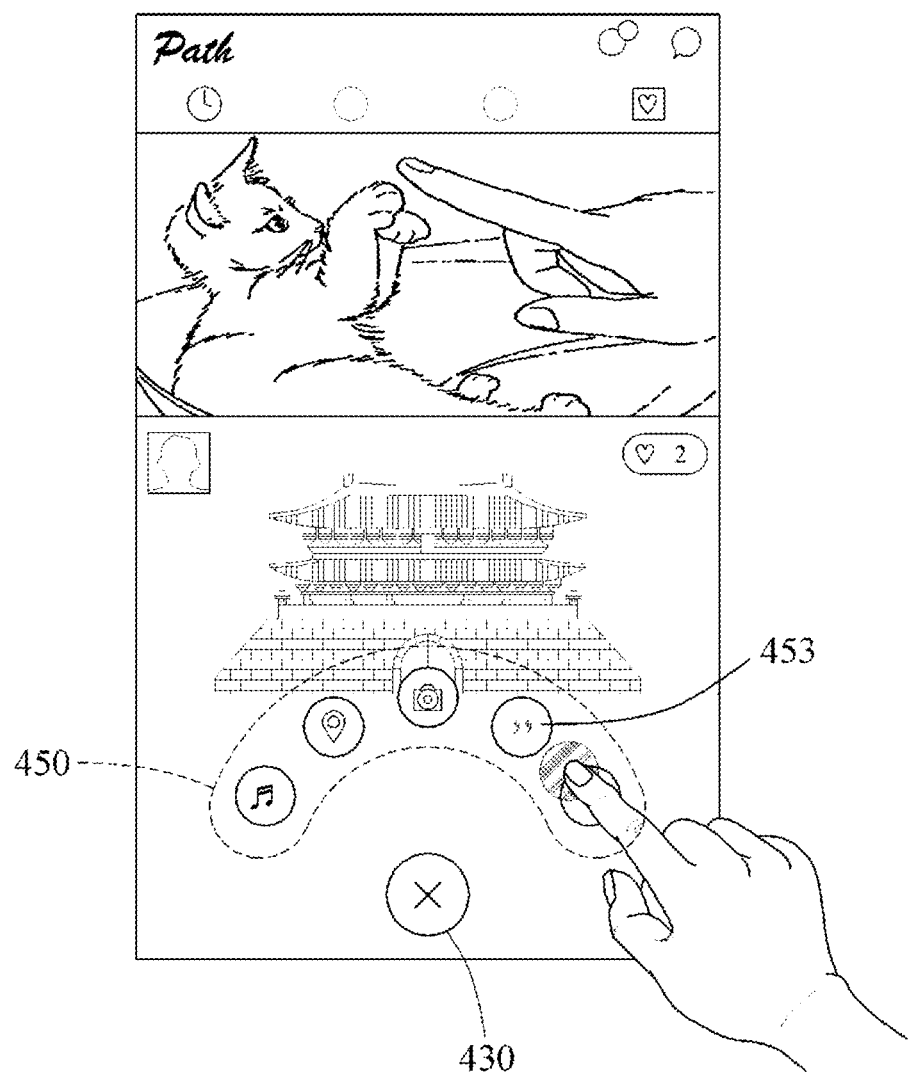

FIGS. 4A and 4B are diagrams each illustrating a user interface provided for content posting according to an embodiment. Referring to FIG. 4A, a user interface 400 may be provided on a display of a user terminal in which an application is installed. In this example, the display of the user terminal may be, for example, a touch screen.

The user interface 400 may include a cover photo 401 and moments received from a social networking system or a server. A moment 410 may include a profile image 411 of a user posting the moment 410, a moment icon 413, content 415 of the moment 410, and a feedback icon 417 on the moment 410.

The moment icon 413 may correspond to a type of the content 415. A moment icon may include, for example, an icon ⓥ indicating a location of the user, an icon ♫ indicating a music appreciated by the user, an icon ✈ indicating that the user is in flight, an icon ⚇ indicating that the user is connected to another user in a social networking system, an icon ⌖ indicating an image or a video captured by the user, an icon ● indicating a comment or a text of the user, an icon ☾ indicating that the user is sleeping, and an icon ☀ indicating the user is awake. As such, the moment icon may include various image or animation corresponding to statuses of the user.

The user interface 400 may include a time icon 403 displayed on a portion of the cover image 401. The time icon 403 may move in response to a movement of a scroll bar. When content corresponding to an area overlapping with the time icon 403 is present, the time icon 403 may indicate a time at which the content is posted. When the content corresponding to an area overlapping with the time icon 403 is absent, the time icon 403 may indicate a current time.

The user may select the menu icon 420, ⊕ provided through the user interface 400 to request a content creation. The user may select the menu icon 420 using, for example, a finger or a stylus pen. When the user selects the menu icon 420, the menu icon 420 may be changed to a menu icon 430, ⊗ as shown in FIG. 4B. Also, a plurality of sub-menu icons 450 may be displayed around the menu icon 430.

According to an embodiment, the sub-menu icons 450 included in the menu icon 430 may be displayed in response to sensing a user contact corresponding to a position of the menu icon 430 on a display, for example, a touch screen of a user terminal. The sub-menu icons 450 may correspond to an interface for creating or generating predetermined type of content to be posted by the user. The sub-menu icons 450 may be provided in a form of moment icons or animations as discussed in the foregoing explanation.

In response to detecting a contact corresponding to a position of a predetermined sub-menu icon among the sub-menu icons 450, a user interface associated with the sub-menu icon may be provided on the display of the user terminal. For example, when the user selects an icon 453 for text creation from the sub-menu icons 450, an interface for text content creation may be provided on the display of the user terminal. The interface for text content creation provided in response to the selecting of the icon 453 and the posting result of the second type content generated based on the content posting method will be described with reference to FIGS. 5A and 5B.

Figure 5A:
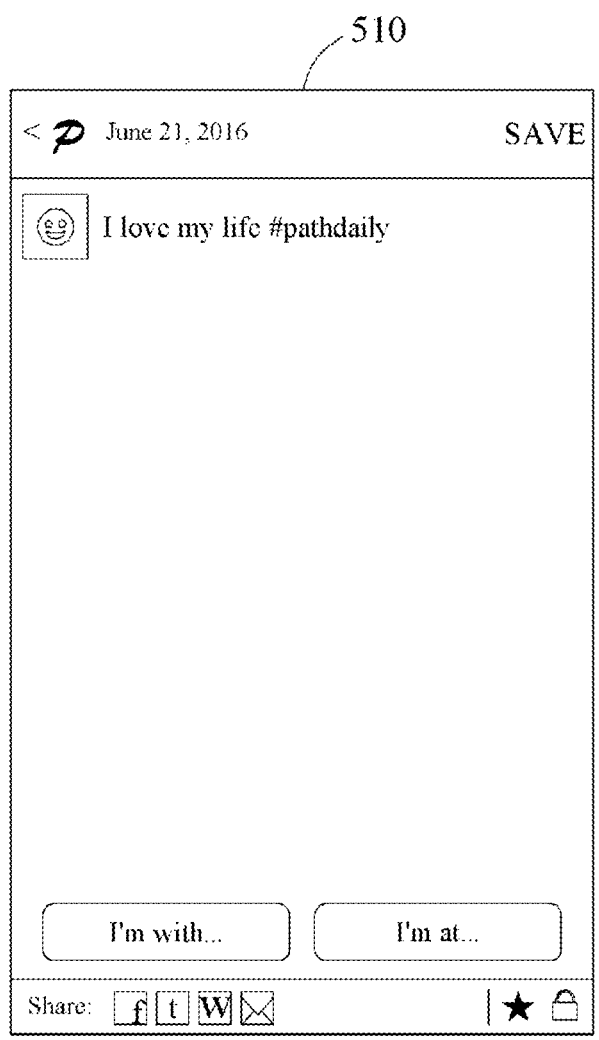
FIGS. 5A and 5B are diagrams illustrating second type content posted according to an embodiment.
Figure 5B:
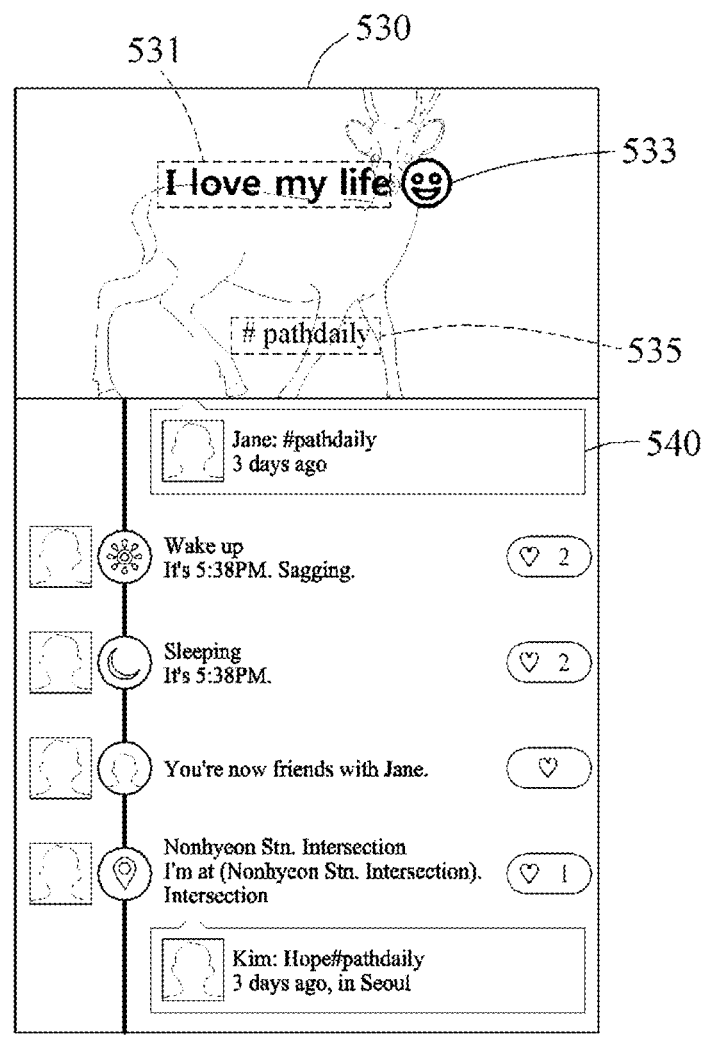

FIGS. 5A and 5B are diagrams illustrating second type content posted according to an embodiment. Referring to FIG. 5A, when a user selects the icon 453 for text creation as described with reference to FIG. 4B, an interface 510 for the text creation may be provided on a display of a user terminal. In this example, a virtual keyboard may be displayed with the interface 510. First type content generated through the interface 510 of FIG. 5A may be converted into second type content and posted as shown in FIG. 5B.

For example, the user may create first type content "I love my life ☺ pathdaily" through the interface 510. A posting apparatus may verify whether a predetermined tag "#pathdaily" is included in the first type content "I love my life ☺ #pathdaily". When the hash tag "#pathdaily" is detected, the posting apparatus may remove the hash tag "#pathdaily" from the first type content "I love my life ☺ #pathdaily" and acquire text information "I love my life ☺".

The posting apparatus may acquire image information for converting the first type content into the second type content. In this example, the posting apparatus may randomly select image information, for example, an image of a deer from candidate image information stored in a database.

The posting apparatus may perform image processing such that text information "I love my life ☺" is displayed over the selected image information. In this example, as indicated by a box 531 with dashed lines, the posting apparatus may display a text "I love my life" included in the text information over the image information based on first color information, first size information, first font information, and first location information. The first color information, the first size information, the first font information, and the first location information may be determined in advance. The first color information, the first size information, the first font information, and the first location information may each be a default value previously set by an application or information set by a user in an initial setup. The first color information, the first size information, the first font information, and the first location information may change based on a setting of the user.

Also, as indicated by an icon 533 of FIG. 5B, the posting apparatus may display an in-line object, for example, an icon ☺ included in the text information over the image information based on second color information, second size information, and second location information. The second color information, the second size information, and the second location information may be determined in advance. The second color information, second size information, and second location information may change based on a setting of the user.

In an example, the posting apparatus may perform image processing such that the text information is displayed in an area differing from an area in which the image information is displayed in lieu of the image processing performed to display the text information over the image information. For example, the image processing may be performed such that the text information is displayed in an area not overlapping the area including the image information or an area partially overlapping the area including the image information.

In an example, the posting apparatus may display image information over the text information and adjust a transparency of the image information such that the text information is provided with the image information. For example, the posting apparatus may perform the image processing by setting a layer including the image information on a layer including the text information and increasing the transparency of the image information such that the text information is displayed over semi-transparent image information.

As discussed in the foregoing explanation, the second type content may also include the hash tag removed from the first type content. The posting apparatus may perform the image processing such that the hash tag "#pathdaily" is displayed over the image information as indicated by a box 535 with dashed lines in FIG. 5B. In this example, the posting apparatus may display the hash tag "#pathdaily" over the image information based on third color information, third size information, third font information, and third location information. The third color information, the third size information, the third font information, and the third location information may be determined in advance. Alternatively, the posting apparatus may display a hash tag image, for example, a mark of "#pathdaily" corresponding to the hash tag "#pathdaily" over the image information. In this example, the hash tag image corresponding to the hash tag may be previously stored in a composable image form.

The posting apparatus may perform the image processing such that the hash tag "#pathdaily" is displayed in an area differing from an area in which the image information is displayed. Also, the posting apparatus may perform the image processing by displaying the image information over the hash tag "#pathdaily" and adjust the transparency of the image information such that the hash tag "#pathdaily" is provided with the image information.

The second type content generated using the aforementioned method may be displayed in the first area 530 in which the image information is displayed on the user terminal. For example, a hash tag may be provided in a text form in the second area 540 associated with the first area 530. Here, the hash tag provided in the text form in the second area 540 may differ from the hash tag "#pathdaily" included in the second type content as indicated by the box 535. For example, the hash tag may be automatically posted in a form of comment for the second type content.

The posting apparatus may be a social networking server. The social networking server may include a communication interface, a detector, and a poster. The detector and the poster may be implemented through at least one hardware module, at least one software module operated by at least one processor, or various combinations thereof.

The communication interface may receive a posting request for first type content from a user terminal. The detector may detect a predetermined hash tag from the first type content.

When the hash tag is detected, the poster may remove the hash tag from the first type content and acquire text information. The poster may acquire image information for converting the first type content into second type content from a database. The poster may generate the second type content based on the image information and the text information and post the second type content. When the hash tag is not detected, the poster may post the first type content.

The posting apparatus may be a user terminal. The user terminal may include a user interface, a processor, and a communication interface.

The user interface may receive first type information from a user. The user interface may include, for example, a touch interface.

The processor may detect a predetermined hash tag from the first type content. When the hash tag is detected, the processor may remove the hash tag from the first type content and acquire text information. The processor may acquire image information for converting the first type content into second type content from a database. The processor may generate the second type content based on the image information and the text information.

When the hash tag is detected, the communication interface may send a posting request for the second type content to a social networking server. When the hash tag is not detected, the communication interface may send a posting request for the first type content to the social networking server.

As the foregoing, the social networking server and the user terminal may perform operations to post content. The descriptions of FIGS. 1 through 5B will be applicable to correspond to a configuration of the social networking server and a configuration of the user terminal.

The embodiments described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method comprising:
    receiving, by at least one server, a posting request for posting on a social networking feed, wherein the posting request comprises texts;
    determining, by the at least one server, whether the texts of the posting request comprise a predetermined hash tag;
    if it is determined that the texts of the posting request do not comprise the predetermined hash tag, posting the texts on the social networking feed;
    if it is determined that the texts of the posting request comprise the predetermined hash tag,
        selecting, by the at least one server, an image from a plurality of candidate images stored in at least one database,
        selecting, by the at least one server, a portion of the texts of the posting request that does not include the predetermined hash tag, and
        causing, by the at least one server, to post an article on the social networking feed such that the selected portion of the texts overlays a portion of the selected image on the posted article.

2. The method of claim 1, wherein the article further comprises the predetermined hash tag that overlays another portion of the selected image.

3. The method of claim 1, wherein the image includes at least one of a still image and a moving image.

4. The method of claim 1, further comprising adjusting transparency of the selected image to generate the article.

5. The method of claim 1, wherein the at least one server combines the selected image and the selected portion of the text to generate a combined image to post the article.

6. The method of claim 1, wherein selecting the image comprises a random selection of the image from the plurality of candidate images.

7. The method of claim 1, wherein the image is selected from the plurality of the candidate images based on at least one of information about a user terminal that sent the posting request, a location where the texts are composed and a time when the texts are composed.

8. A non-transitory computer readable medium storing a computer program, the computer program being configured to control at least one computer to perform the method of claim 1.

9. A social networking server comprising:
    at least one memory storing program instructions;
    at least one database storing a plurality of images; and
    at least one processor configured to execute the program instructions to cause the social networking server to:
        receive a posting request for posting on a social networking feed, wherein the posting request comprises texts;
        determine whether the texts of the posting request comprise a predetermined hash tag;
        if it is determined that the texts of the posting request do not comprise the predetermined hash tag, post the texts on the social networking feed;
        if it is determined that the texts of the posting request comprise the predetermined hash tag,
            select an image from the plurality of images stored in the at least one database,
            select a portion of the texts of the posting request that does not include the predetermined hash tag, and
            post an article on the social networking feed such that the selected portion of the texts overlays a portion of the selected image on the posted article.

10. A user terminal comprising:
    at least one memory storing program instructions,
    at least one database storing a plurality of images, and
    at least one processor configured to execute the program instructions to:
        receive a user input for posting on a social networking feed, wherein the user input comprises texts;
        determine whether the texts of the user input comprise a predetermined hash tag;
        if it is determined that the texts of the user input do not comprise the predetermined hash tag, send to at least one server of a social networking service data for posing the texts on the social networking feed;
        if it is determined that the texts of the user input comprise the predetermined hash tag,
            select an image from the plurality of images stored in the at least one database,
            select a portion of the texts of the posting request that does not include the predetermined hash tag, and
            send, to the at least one server of the social networking service, data for posing an article on the social network feed such that the selected portion of the texts overlays a portion of the selected image on the posted article.

* * * * *